United States Patent
Edmon

(10) Patent No.: US 8,380,181 B2
(45) Date of Patent: Feb. 19, 2013

(54) REMOTE SITE TELECOM EQUIPMENT COMMUNICATION

(75) Inventor: Eugene Edmon, Danville, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 842 days.

(21) Appl. No.: 11/872,587

(22) Filed: Oct. 15, 2007

(65) Prior Publication Data

US 2008/0030321 A1    Feb. 7, 2008

Related U.S. Application Data

(63) Continuation of application No. 11/202,691, filed on Aug. 12, 2005, now abandoned.

(51) Int. Cl.
*H04M 3/00* (2006.01)
*H04M 1/24* (2006.01)

(52) U.S. Cl. ..... 455/420; 455/418; 455/419; 379/29.01; 379/29.13; 379/29.04

(58) Field of Classification Search ........... 455/418–420
See application file for complete search history.

(56) References Cited

U.S. PATENT DOCUMENTS

| | | | | |
|---|---|---|---|---|
| 5,123,017 A * | 6/1992 | Simpkins et al. | ............... | 714/26 |
| 5,675,371 A | 10/1997 | Barringer | | |
| 6,067,030 A * | 5/2000 | Burnett et al. | ........... | 340/870.05 |
| 6,553,336 B1 | 4/2003 | Johnson et al. | | |
| 6,823,291 B2 * | 11/2004 | Marsland | ...................... | 702/188 |
| 7,098,784 B2 * | 8/2006 | Easley et al. | ............. | 340/539.13 |
| 7,113,893 B2 * | 9/2006 | Williams et al. | ............... | 702/188 |
| 2005/0007406 A1 * | 1/2005 | Haas et al. | ........................ | 347/17 |
| 2005/0124333 A1 * | 6/2005 | Van Den Bogaert et al. | . | 455/420 |
| 2005/0273183 A1 * | 12/2005 | Curt et al. | ........................ | 700/22 |
| 2006/0163349 A1 | 7/2006 | Neugebauer | | |

* cited by examiner

*Primary Examiner* — Huy C Ho
(74) *Attorney, Agent, or Firm* — Jackson Walker L.L.P.

(57) ABSTRACT

The present invention provides for a system, method and apparatus for monitoring telecommunication components. The invention provides a switch placed at a remote location, wherein the switch includes a converter that converts power from a first voltage to a second voltage, a plurality of communication lines for a connection to a plurality of end users; and an interface that establishes a communication link with a central office. A transmitter is associated with the converter or other switch component; the transmitter transmits a wireless signal relating to a converter or other switch component operating condition. A receiving device receives wireless signals from the transmitter and provides the signals to a serving area interface for processing and/or transmission of the signals to a Central Office for monitoring. A transmitter may initiate transmission upon the occurrence of a change in operating condition.

18 Claims, 3 Drawing Sheets

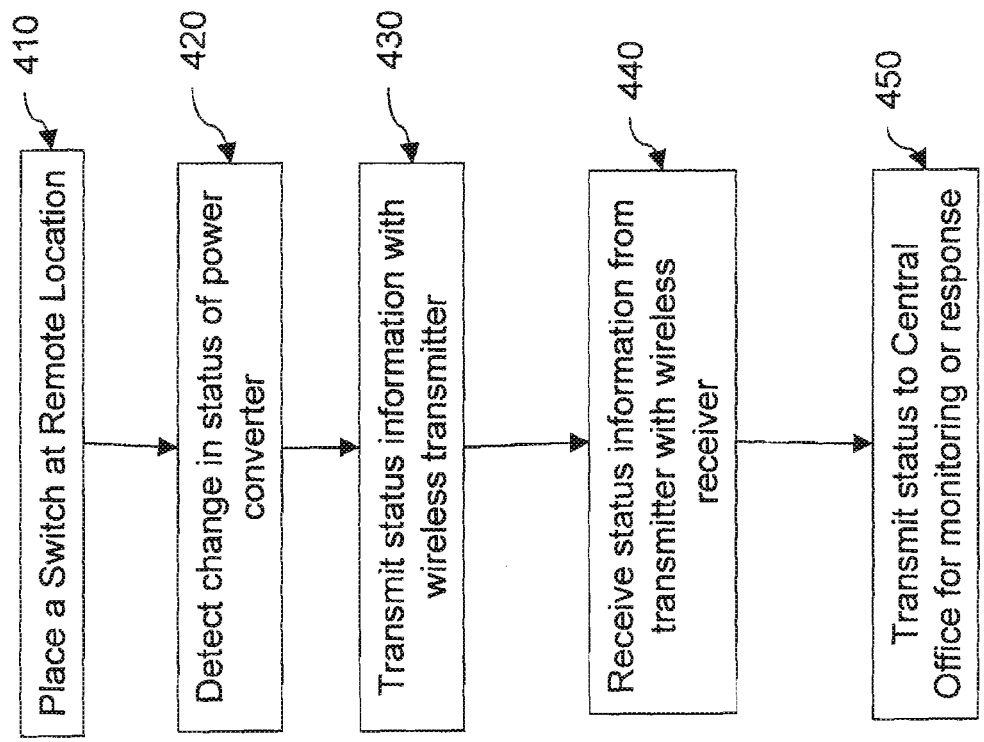

REMOTE SITE TELECOM EQUIPMENT COMMUNICATION

CROSS REFERENCE TO RELATED APPLICATIONS

This is a continuation of U.S. patent application Ser. No. 11/202,691, filed Aug. 12, 2005.

BACKGROUND OF THE INVENTION

1. Field of the Invention

The present invention relates in general to the field of real time information monitoring of remote equipment and in particular to monitoring and/or control of telecommunication field units.

2. Description of the Related Art

Status information for components of remote facilities equipment are generally transmitted from a sensor over wires or coaxial cable to a receiver in the remote equipment where the information is processed and/or forwarded to a main facility like a Central Office (CO). This status information includes information such as: power converter status, battery life indicators, cable continuity alarms, etc. Providing individual wiring for each component and a multiplicity of sensors adds expense and complexity to the remote equipment. Sending this data via wires that are not dedicated to status information reduces the bandwidth available and frequently yields poor or unreliable results due to the accumulation of noise within the communication channel. Failures in these transmitters can add noise to the wires or coaxial cable, which further degrades the information quality. Thus, there is a need for a simple and cost efficient way for handling system status and fault information.

SUMMARY OF THE INVENTION

The present invention provides a method and apparatus for monitoring telecommunication components. The system of the invention includes a switch placed at a remote location that provides telecommunication between a central office and multiple users. The switch includes a converter that converts power from a first voltage (generally a higher voltage), to a second voltage (generally a lower voltage), a plurality of communication lines that are linked to a plurality of end users, and an interface that establishes a communication link between the end user and the central office. A transmitter or a transmitting device is associated with the converter or other switch components that transmits a wireless signal relating one or more operating conditions of the converter or other switch components. A receiving device receives the wireless signals from the transmitter and provides the signals to a serving area interface for processing and/or transmission of the signals to the Central Office for the monitoring. The transmitter may initiate transmission upon the occurrence of a change in an operating condition of the switch components. Both the transmitter device and the receiving device may be transceivers.

Examples of the more important features of the invention have been summarized (albeit rather broadly) in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE FIGURES

Features of the present invention will become apparent from the following detailed description considered in connection with the accompanying drawings disclosing embodiments of the present invention. It should be understood, however, that the drawings are designed for the purpose of illustration only and not as a definition of the limits of the invention. For a detailed understanding of the present invention, references should be made to the following detailed description of an exemplary embodiment, taken in conjunction with the accompanying drawings, in which like elements have been given like numerals and, wherein similar reference characters denote similar elements throughout the several views:

FIG. 3 shows a flow chart of an exemplary method according to by the present invention.

Figure 1:
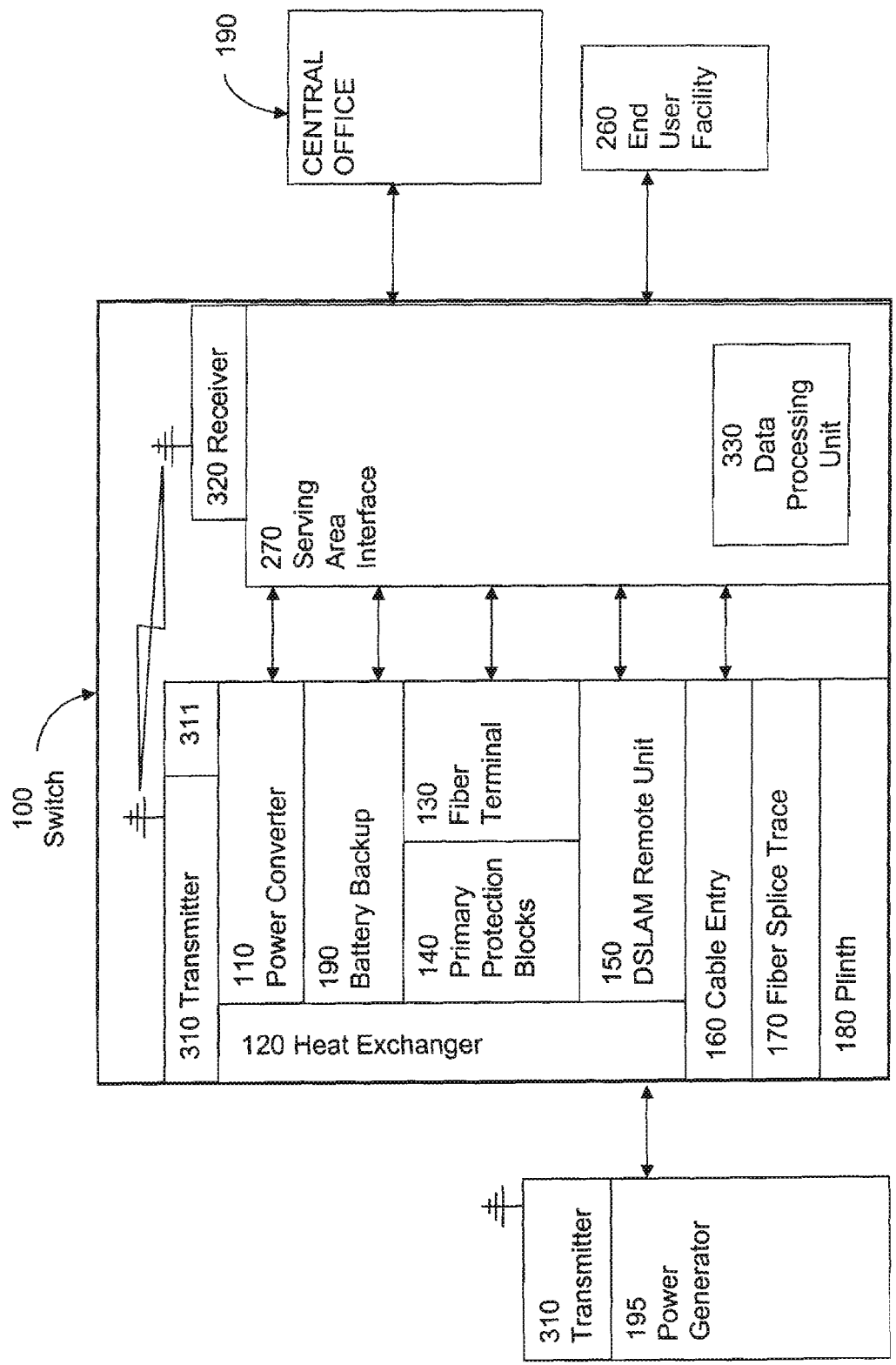
FIG. 1 shows a block diagram of a switch at a field location.

While the invention will be described in connection with its one or more embodiments, it will be understood that the invention is not limited thereto. It is intended to cover all alternatives, modifications, and equivalents that may be included within the spirit and scope of the invention, as defined by the appended claims.

DETAILED DESCRIPTION OF THE INVENTION

In view of the above, the present invention through one or more of its various aspects and/or embodiments is presented to provide one or more advantages, such as those noted below. The present invention provides for real-time status information to communication system users.

The present invention provides methods, systems and apparatus for providing switching system component alarm and status information to a Central Office (CO) from a remote site equipment. Because of the low overall data rate used for status, alarm and control information, wired or cable communications systems with wide bandwidth are not necessary.

The present invention is therefore directed to the problem of developing a remote sensing apparatus for sensing and transmitting remote equipment performance and status, which is cost effective and simple, yet returns the data in real time. Furthermore, the present invention is directed to the problem of developing a method and apparatus for remote sensing that can transmit a large number of sample points as necessary, as well controlling or implementing system or component failure responses as required.

In one aspect, the present invention provides wireless monitoring of remote equipment. In addition, the present invention permits monitoring of fluctuating values—in real time—and the transmission of the system status and fault conditions to a CO or other destination allowing for rapid response. For example, the present invention permits monitoring of a field switch that is linked to multiple users. The switch may comprise several components including a power converter or battery backup system. The status of these and other switch components may vary over time. The status information may be wirelessly communicated so that corrective actions may be taken. Corrective action may be implemented through the wireless communication system, for example by initiating backup power systems in the event of a power failure.

The present invention recognizes the particular application of wireless telemetry to the problem of monitoring status in remote equipment. Modem wireless systems infrastructure components can be less expensive than providing wires or cables from end to end. By using communication bandwidth outside of the wire or cable, users can more efficiently utilize what bandwidth they have available. In addition, this solution enhances the reliability, since the information return path to the CO may be separate from the remote site forward data path.

Existing systems typically utilize one communication channel to receive requests for service or generate alarm conditions. The control channel continuously receives and transmits data and is a channel which is therefore unavailable for other communication.

One example of a wireless system that may be implemented with the present invention is a system by which small amounts of data can be detected by sensors associated with equipment components, like switching components, and the data communicated from remote wireless transceivers to a customer's facility. The existing infrastructure may be exploited with little or no significant increase in expense. The desired preferences for wireless infrastructure supporting such an application include: i) low power consumption, ii) extended dormant periods, iii) ease of implementation, and iv) low cost.

A 'Zigbee' network is one such wireless system. Zigbee is a standards-based wireless technology having the performance characteristics that closely meet the requirements for reliability, security, low power and low cost. This standards-based, interoperable wireless technology addresses the needs of low data rate wireless control and sensor-based networks as provided by the present invention.

A wireless standard known as the "Zigbee" standard has been developed by an IEEE 802.15 Task Group charged with investigating a low data rate solution with multi-month to multi-year battery life and very low complexity. Zigbee operates in an unlicensed, international frequency band. The Zigbee standard defines the physical layer (PHY) and the media access controller (MAC) as well as application profiles.

Zigbee devices are of three types: i) The network coordinator (NC) that maintains overall network knowledge; it is the most sophisticated of the three Zigbee device types and requires the most memory and computing power; ii) The full function device (FFD) supports all 802.15.4 functions and features specified by the standard; it can function as a network coordinator; Additional memory and computing power make it ideal for network router functions or for component interface applications; iii) The reduced function device (RFD) carries limited (which may be specified by the standard) functionality to lower cost and complexity; these are generally found in network-edge devices that interface with components/appliances. At least one type of Zigbee device, the RFD, is designed to stay in deep-sleep until the occurrence of an event that will bring it awake. A RFD is generally used at the network edge, and can be as simple as a transceiver, an 8-bit microprocessor or a device supported by pair of AAA batteries. An RFD is just smart enough to communicate with the network; it usually cannot relay data from other devices. An RFD requires less memory and is less expensive to manufacture than an FFD. An RFD may be transmitter, a receiver or a transceiver.

The application of the present invention is illustrated with an example of system status and fault communication between a power converter and the communication interface (Serving Area Interface or SAI) associated with telephone switching equipment. The switching equipment in this example is a Digital Subscriber Line Access Multiplexer (DSLAM or DSL Access Multiplexer). A DSLAM is network device at a telephone company central office or a remote site that receives signals from multiple customer Digital Subscriber Line (DSL) connections and puts the signals on a high-speed backbone line using multiplexing techniques.

FIG. 1 illustrates an example of a remote communications switch 100. Switch 100 includes several components, for example a +/−190V (a relatively high voltage) to +/−48V DC/DC (a relatively low voltage) Converter 110 for line powering over a twisted pair. Switch 100 may also have a battery backup system to enable switch functioning in the event of a power failure.

The power converter equipment 110 receives power from an external source (not shown) to be stepped down to power a series of 48 vdc twisted pair lines out. Also Switch 100 may contain a Passive External Loop Heat Exchanger 120 to dissipate heat from the Switch 100 enclosure and components. The switch may have any number of twisted pair lines in and out. The switch further comprises a Single Mode Fiber terminal 130. The 5-pin Primary Protection Blocks (140) contain for remote power feed. The Switch 100 comprises a DSL Access Multiplexer Remote Unit 150 that may have any number of Ports of DSL with integrated splitters, cable entry 160, and fiber management splice tray 170.

Figure 2:
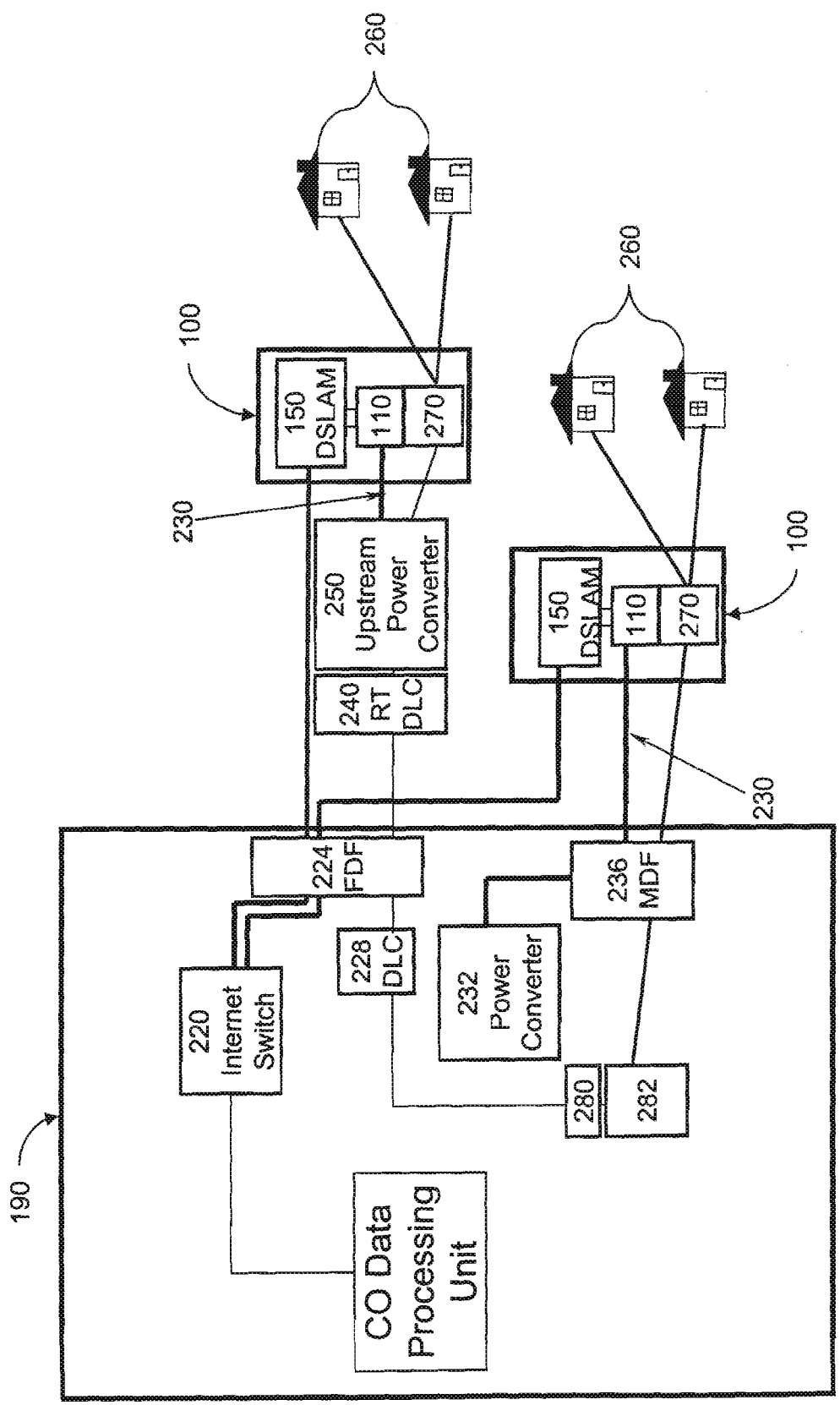
FIG. 2 shows a telecommunication system according to one embodiment of the present invention.

An embodiment of a line powering and communications system according to one aspect of the present inventions is illustrated in FIG. 2. A Central Office (CO) 190 is comprised of several components. The CO 190 has an internet switch 220, which could be an Alcatel 7450 Ethernet Switch or another switch performing switching functions. Also, the CO has a Fiber Distribution Frame (FDF) 224. A fiber distribution frame is the interface between the transmission equipment and the optical network. At the point in the network where the fiber from the transmission equipment meets the fiber from the subscriber/trunk network, there must be some type of cross-connection to facilitate cable rearrangements, measurements and fault location of optical lines. The main function of the FDF is to organize and terminate fiber at this point. Used in conjunction with cable heads, this main distribution frame makes it possible to utilize various existing cable structures (Indoor or outdoor cabling, slotted core or tube structure, single mode or multi-mode fibers). A Central Office Terminal (CT) Digital Loop Carrier (DLC) 228 will also be present. Digital Loop Carrier is equipment that bundles a number of individual phone line signals into a single, multiplexed digital signal for local traffic between a telephone company CO and a remote location. The CO may further include upstream DC/DC power converter 232 for use with CO-based line power, for example when power is over twisted pair 230 from the CO. A Main Distribution Frame (MDF) 236 may be used with power from the CO and communications to a local digital switch (LDS) 282 receiving signals from a DSX-1 280 (cross-connection point for DS-1 signals) or other communication connection. A distribution frame is a cross-connect device that enables taking wires in from the outside and connecting appropriately to the wires inside the CO. MDF is a distribution frame on one part of which the external trunk cables entering a facility terminate, and on another part of which the internal user subscriber lines and trunk cabling to any intermediate distribution frames terminate. The MDF may be used to cross-connect any outside line with any desired terminal of the multiple cabling or any other outside line.

Switch 100, when power is supplied from an upstream power converter 228 in the CO, interfaces by way of a wiring junction and interconnection point, called a Serving Area Interface (SAI) 270. The SAI 270 permits the feeder cable pairs to be connected to any of several distribution cables. The SAI 270 is relatively near the customer premises and typically serves 200 to 600 user facilities 260. Switch 100 may contain DSL Access Multiplexer Remote Node (RN) 150, a downstream power converter 110 and SAI 270. Communication signals, and optionally power, proceed between the SAI 270 and a network interface device (NID) at User facilities 260.

When a Remote Terminal (RT) or Cabinet-based Line Power scheme is employed, power to the DSLAM is supplied outside of the CO, an RT DLC 240 associated with Upstream DC/DC Power Converter 250 interfaces with a Serving Area Interface (SAI) 270 in connection with a Remote DSLAM such as the example Switch 100. Switch 100 may contain DSL Access Multiplexer RN 150, a downstream power converter 110 and SAI 270. Communication signals, and optionally power, proceed between the SAI and a network interface device (NID) at User facilities 260.

Returning to FIG. 1, a wireless transmitter 310, which may be Zigbee reduced function transceiver, is associated with a sensor 311 that connects to any component in the Switch 100 and monitors components, such as power converter 110, for a failure or a change of status or other parameter of interest. The sensor 311 measures any parameters of Switch 100 components' status including one or more of output voltage, battery voltage, and other parameters of interest. When a change of status occurs, for example when voltages or other parameters fall out of preset boundary values, the reduce function device 310 is 'awakened' and a message is transmitted on an RF link to be received by a receiver 320, which may be a full function Zigbee wireless transceiver associated with an SAI 270. While SAI 270 is shown in FIG. 1 as part of switch 100, it will be appreciated that SAI 270 need not be housed in the same cabinet or structure with other switch components. The transmission from transmitter 310 may be initiated upon the occurrence of a change of status. The information packet received contains identifying information and system or alarm information. This data broadcast (which may be been requested by a FFD or Network Coordinator transceiver device) is received and passed on to the Central Office 190 where it may be stored in memory or automatically entered into a program. Prior to sending the data to the CO 190, the data may be processed or conditioned by a data processing unit 330 associated with SAI 270, which may have associated memory. A user of the data can access the Central Office via the internet or the Public Switched Telephone Network (PSTN) and retrieve the information. Alternatively the data may be processed at the remote unit 100 or the CO 190 such that responses are implemented as a result of the data values. An example response is for initiation of functions performed by battery backup 190 in the event of a power failure.

Some users, which may be associated with the CO 190, such as alarm or maintenance companies, may remain in continuous communication with a remote unit in order to ensure the fastest possible response time.

FIG. 1 illustrates a power generator 195, for example a backup power generator to be used during a power failure. Power generator 195 has an associated transmitter 310 (which may be a transceiver) to communicate status to receiver 320. When transmitter 310 associated with power generator 195 is also a transceiver, power generator 195 may receive control instructions from data processing unit 330 or CO 190.

FIG. 3 illustrates a flow chart of a method provided by the present invention for monitoring a power converter 110 or other components of a switch 100. For a switch 100 placed at a remote location 410, where the switch 100 includes a converter 110 that converts power from a first voltage to a second voltage and a plurality of communication lines for a connection to a plurality of end users, along with an interface that establishes a communication link with a CO 190, a signal relating to a change operating condition of the converter 420 is transmitted using a wireless transmitter associated with the converter 430. The signal is received 440 with a wireless receiving device 320 associated with the interface 270 from the transmitter 310 associated with the converter 110 and transmitting 450 the signal to the CO 190 for monitoring the condition of the converter. The signals may be processed or otherwise conditioned with a processor 330 and associated memory at remote switch 100 prior to communication with the CO 190. Information may be sent in real time to the CO 190 so that the CO 190 may prepare for generation of reports or required responses including repair/maintenance reports. Reports may then be provided for service personnel to take corrective action when needed. Routine maintenance may be scheduled on the basis of these reports on ongoing system monitoring. Thus the present invention provides for a real time monitoring system for remote telecom equipment.

The present invention is a relatively low cost yet effective device that enables status and alarm information from new or existing communications equipment. By keeping the cost and size to a minimum, using low-cost wireless transmitters and receivers (or transceivers), the present invention permits the system operator to monitor all critical equipment in a remote site from a Central Office to improve the system reliability, increase customer satisfaction, and reduce system down time. In addition, battery and equipment life can be extended by more periodic cycling, thereby reducing costs. The component replacement operations can occur automatically or in response to power converter diagnostic values rather than when catastrophic failure inconveniently requires maintenance. Overall, system outages due to power supply problems can be greatly reduced, and costs associated with maintaining the plant equipment can also be reduced.

Accordingly, while embodiments of the present invention have been shown and described, it is to be understood that many changes and modifications may be made thereunto without departing from the spirit and scope of the invention as defined in the appended claims.

The present invention described herein is well adapted to carry out the objects and attain the ends and advantages mentioned, as well as others inherent therein. While various embodiments of the invention have been given for purposes of disclosure, numerous changes exist in the details of procedures for accomplishing the desired results. Various modifications will be apparent to those skilled in the art. It is intended that all variations within the scope and spirit of the appended claims be embraced by the foregoing disclosure.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

What is claimed is:

1. A telecommunication monitoring system switch associated with a central office, the telecommunication system monitoring switch comprising:
    a converter to convert a first voltage to a second voltage;
    a sensor, coupled to the converter, to provide a status signal relating to an operating condition of the converter;
    a communication interface to establish communication links with the central office and with a plurality of end users over a plurality of communication lines; and
    a transmitter device, associated with the converter, to wirelessly transmit the status signal to a receiving device associated with the communication interface;
    wherein the receiving device communicates the status signal to the central office, wherein the communication interface is a digital subscriber loop multiplexer, and wherein the transmitter device is a reduced function device in deep-sleep until awakened in response to a change in the operating condition.

2. The telecommunication monitoring system switch of claim 1, further comprising a processor, associated with the communication interface, for processing the signal at the communication interface.

3. The telecommunication monitoring system switch of claim 1 wherein the transmitter device initiates transmission responsive to a change in the operating condition.

4. The telecommunication monitoring system switch of claim 3 wherein the change in the operating condition is selected from a power failure and a change in power.

5. The telecommunication monitoring system switch of claim 1 wherein the transmitter device is a transceiver.

6. The telecommunication monitoring system switch of claim 1 wherein the receiving device is a full function device.

7. The telecommunication monitoring system switch of claim 1 wherein the receiving device is a transceiver.

8. The telecommunication monitoring system switch of claim 1 wherein the transmitting device randomly initiates communication with the receiving device.

9. A telecommunication device monitoring method comprising:
    providing a switch at a remote location, the switch including:
        a converter that converts power from a first voltage to a second voltage,
        a sensor coupled to the converter that provides a converter signal relating to an operating condition of the converter, and
        a communication interface that establishes a communication link with a central office and a plurality of end users over a plurality of communication lines;
    wirelessly transmitting the converter signal from a wireless transmitter associated with the converter to a wireless receiving device associated with the communication interface; and
    communicating the converter signal to the central office;
    wherein the communication interface is a digital subscriber loop multiplexer, and wherein the wireless transmitter is a reduced function device configured to stay in deep-sleep and to awaken in response to a change in the operating condition.

10. The method of claim 9 further comprising processing the converter signal at the communication interface.

11. The method of claim 9 wherein wirelessly transmitting the converter signal initiates upon a change in the operating condition.

12. The method of claim 11 wherein the change in the operating condition includes a change selected from a power failure and a change in power.

13. The method of claim 9 wherein the wireless transmitter is a transceiver.

14. The method of claim 9 wherein the wireless receiving device is a full function device.

15. The method of claim 9 wherein the wireless receiving device is a transceiver.

16. A telecommunication monitoring system switch, comprising:
    a converter to convert power from a first voltage to a second voltage;
    a sensor, coupled to the converter, to generate a converter signal indicating an operating condition of the converter;
    a digital subscriber loop access multiplexer having a connection to a central office;
    a serving area interface to establish communication links with the central office and with a plurality of end users over a plurality of communication lines;
    a reduced function transmitter device, associated with the converter, to wirelessly transmit the converter signal; and
    a full function receiving device, associated with the serving area interface, for wirelessly receiving the converter signal and for communicating the converter signal to the central office;
    wherein the reduced function transmitter device is a reduced function device in deep-sleep and to awaken in response to a change in the operating condition.

17. The system of claim 16 wherein the reduced function transmitter device is a Zigbee device.

18. The system of claim 16 wherein the full function receiving device is a Zigbee device.

* * * * *